Feb. 19, 1957 P. E. CLINGMAN ET AL 2,782,058
CONNECTOR FOR FLEXIBLE TUBING
Filed Nov. 14, 1952

INVENTOR.
PAUL E. CLINGMAN
CLYDE H. SCHAMEL
BY

ATTORNEYS

United States Patent Office 2,782,058
Patented Feb. 19, 1957

2,782,058

CONNECTOR FOR FLEXIBLE TUBING

Paul E. Clingman, Dayton, Ohio, and Clyde H. Schamel, Detroit, Mich., assignors to General Motors Corporation, Detroit, Mich., a corporation of Delaware Application November 14, 1952, Serial No. 320,538

2 Claims. (Cl. 285—212)

This invention relates to a tubing connector and more particularly to a fitting adapted to connect and seal a flexible elastomeric tubular member to another member.

The object of our invention is to provide a sealed terminal connection for elastomeric tubing adapted to withstand a substantial tensile stress.

Another object of the present invention is to provide a connecting means for an elastomeric tubing capable of sustaining a substantial tensile stress and adapted to repeatedly reform a seal when the tubing is repeatedly disconnected and reconnected.

A more specific object of the present invention is to provide an elastomeric fitting on a terminal end of an elastomeric tubular element wherein a bearing surface is interposed between a seal and a rotating element so as to protect the seal when the connector is repeatedly disconnected and reconnected.

Further objects and advantages of the present invention will be apparent from the following description, reference being had to the accompanying drawing, wherein a preferred embodiment of the present invention is clearly shown.

Figure 1:
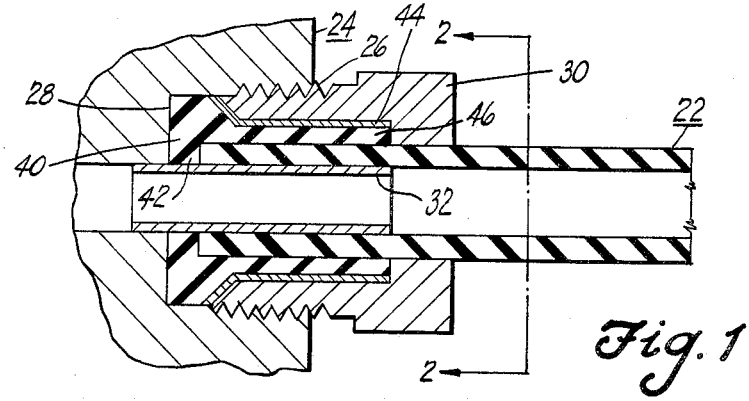
Fig. 1 shows a sectional view of the connecting fitting embodying the present invention.
Figure 2:
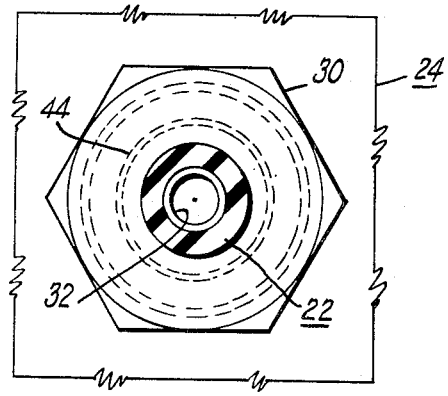
Fig. 2 shows an end view of the fitting as shown in Fig. 1.
Figure 3:
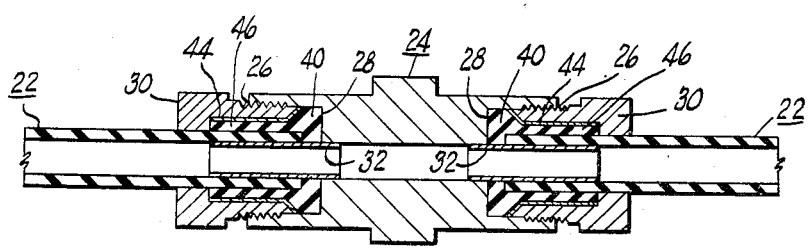
Fig. 3 shows the connection of two lengths of hose with a fitting embodying the present invention.

In the drawing and in Figure 1 particularly, one form of our present invention is shown. The connecting device shown is adapted to connect an elastomeric tubular element 22 to a fitting 24 having a threaded aperture 26 and an annular seat 28 therein. A flanged portion 40 is provided on the terminal end of the tube 22 to cooperate with the seat 28.

In the embodiment shown, a flanged member or portion 40 is sealingly attached to the end of the tube 22. The flanged member 40 has an inwardly extending lip 42 attached to the transverse end portion of the hose and an outwardly extending flange to receive a gland 44 to be later described. In the preferred embodiment, a tubular fitting 32 is partially inserted into the internal bore of the tube 22 to prevent the collapse of the tube when it is subject to longitudinal stresses. When this member 32 is used, the lip 42 may be sealingly attached to the member 32. A wear resistant gland 44 is interposed between the elastomeric flange portion 46 and the nut 30. This gland which extends axially and transversely over a portion of the flanged member 40 is adapted to provide a bearing surface between the nut 30 and the flanged portion 40 when the nut 30 is rotated to compress a portion of the flange 40 against the fitting 24.

From the above it will be apparent that the flanged portion 40 may be formed integrally or separately on the tube 22 composed of plastic, natural or synthetic rubber or other suitable material. The nut may have external threads, internal threads, or any other suitable means to draw and connect the elements together thereby compressing a portion of the flange against a fitting. The gland which may be of metal, plastic, hard rubber or other suitable relatively hard material is interposed between the rotatable fastening means and the relatively stationary flanged elastomeric portion prevents the frictional wearing contact between the seal and nut, thereby permitting a repeated use of the fitting without destroying the efficiency of the seal.

Since this invention is basically directed to a sealing structure, the materials per se are of slight import so long as the flanged portion 40 is elastomeric and the gland portion which may be integral or separate from the flanged portion is of a relatively hard material. The flanged portion 40 may be formed from any of the elastomeric rubber-like materials including plastics, synthetic rubbers, natural rubber, etc. or combination thereof.

While the embodiment of the present invention as herein disclosed, constitutes a preferred form, it is to be understood that other forms might be adopted.

What is claimed is as follows:

1. A connector of the character described comprising; a member having; a bore, a female threaded portion coaxial with said bore and a substantially radial wall extending between said bore and threaded portion, a male nut having; male threads receivable in said female threads, a central bore, a flange providing an apertured radial wall on one end of said bore and an inclined surface on the other end of said bore, a length of tubing having; a free end, an internal diameter substantially equal to the bore in said member and an outer diameter less than the aperture in the radial wall of said nut, a tubular elastomeric member having; an annular portion sealingly attached to the outside surfaces of said tubing adjacent the end of the tubing, an inwardly extending flange portion attached to the end surfaces of said end of tubing, and an outwardly extending flange having a portion thereof engageable with the radial wall of said member and an inclined surface, and a gland of more wear resistant material than said elastomeric member interposed between said nut and elastomeric member, said gland having a portion shaped to engage the inclined surface of the outward extending flange and being constructed and arranged to compress both flange portions of said elastomeric member against the radial wall of said member for effecting a seal therebetween when the nut is threaded in said member so the inclined surfaces thereof through the inclined portion of the gland which engages the inclined surface of said flange compresses both of the flanges against said radial wall.

2. A connector of the character described comprising; a member having; a bore, a female threaded portion coaxial with said bore and a substantially radial wall between said bore and threaded portion, a male nut having; male threads receivable in said female threads, and a central bore with a flange providing an apertured radial wall on one end of said bore and an inclined surface on the other end of said bore, a length of tubing having a free end, an internal diameter substantially equal to the bore in said member and an outer diameter less than the aperture in the radial wall of said nut, a tubular element snugly receivable in the bore of said member and extending into and sealingly attached in the bore adjacent the end of the tubing, a tubular elastomeric member having; an annular portion sealingly attached to the outside surfaces of said tubing adjacent the end of the tubing, an inwardly extending flange portion attached to the end surfaces of said end of tubing and to said tubular member, and an outwardly extending flange having a portion thereof engageable with the radial wall of said member and an inclined surface on another portion, a gland of more wear resistant material than said elastomeric member interposed between said nut and elastomeric member, said gland having a portion shaped to engage the inclined surface of the outward extending flange and the inclined surface of said nut, said gland being constructed and arranged to compress both the inward and outward extending flange portions of said elastomeric member against the radial wall of said member for affecting a seal therebetween when the nut is threaded in said member and against the portion of the gland which engages the inclined surface of said flange.

References Cited in the file of this patent

UNITED STATES PATENTS

| | | |
|---|---|---|
| 515,925 | Ricketts | Mar. 6, 1894 |
| 561,442 | Schmidt | June 2, 1896 |
| 616,808 | Ricketts | Dec. 27, 1898 |
| 1,839,338 | Pentz | Jan. 5, 1932 |
| 1,982,553 | Parker | Nov. 27, 1934 |
| 2,148,036 | Pfefferle | Feb. 21, 1939 |
| 2,269,695 | Scharf | Jan. 13, 1942 |
| 2,366,444 | Dorman | Jan. 2, 1945 |
| 2,463,407 | Melton | Mar. 1, 1949 |
| 2,690,901 | McCormack | Oct. 5, 1954 |